United States Patent [19]
Rudert

[11] 3,903,468
[45] Sept. 2, 1975

[54] METHOD OF OBTAINING A CONSTANT VOLTAGE OUTPUT IN POWER SUPPLIES

[75] Inventor: Bernhard S. Rudert, Sandton, South Africa

[73] Assignee: Inpel (Proprietary) Limited, Johannesburg, South Africa

[22] Filed: Mar. 11, 1974

[21] Appl. No.: 450,042

[30] Foreign Application Priority Data
Mar. 19, 1973 South Africa.................... 73/1893

[52] U.S. Cl............................... 321/2; 323/DIG. 1
[51] Int. Cl.²...................................... H02M 3/335
[58] Field of Search........... 321/2, 18; 323/17, 22 T, 323/DIG. 1

[56] References Cited
UNITED STATES PATENTS

| | | | |
|---|---|---|---|
| 3,226,630 | 12/1965 | Lampke......................... | 323/DIG. 1 |
| 3,551,777 | 12/1970 | Bingley................................... | 321/2 |
| 3,737,756 | 6/1973 | Hasley et al............................ | 321/2 |
| 3,838,329 | 9/1974 | Michelet et al......................... | 321/2 |

OTHER PUBLICATIONS
Singleton, "Wide Range Uniformly High-Efficiency DC–DC Converter," IBM Technical Disclosure Bulletin, Vol. 15, No. 4, Sept. 1972, pp. 1359, 1360.

*Primary Examiner*—A. D. Pellinen
*Attorney, Agent, or Firm*—Irwin M. Aisenberg

[57] ABSTRACT

A method of obtaining a constant voltage characteristic in a transistorized power supply utilizing pulse width modulated d.c. - d.c. conversion comprises sensing the output voltage of the power supply and integrating for each half cycle of the power supply the output voltage with time. The pulse drive to the output transistors of the power supply is terminated when a required value of the integral is reached. During the following period of drive circuit delay and storage time of the output transistors after termination integration of voltage with time continues and the value of the integral obtained in this period is subtracted from the integral obtained during the next half of the power supply output.

9 Claims, 1 Drawing Figure

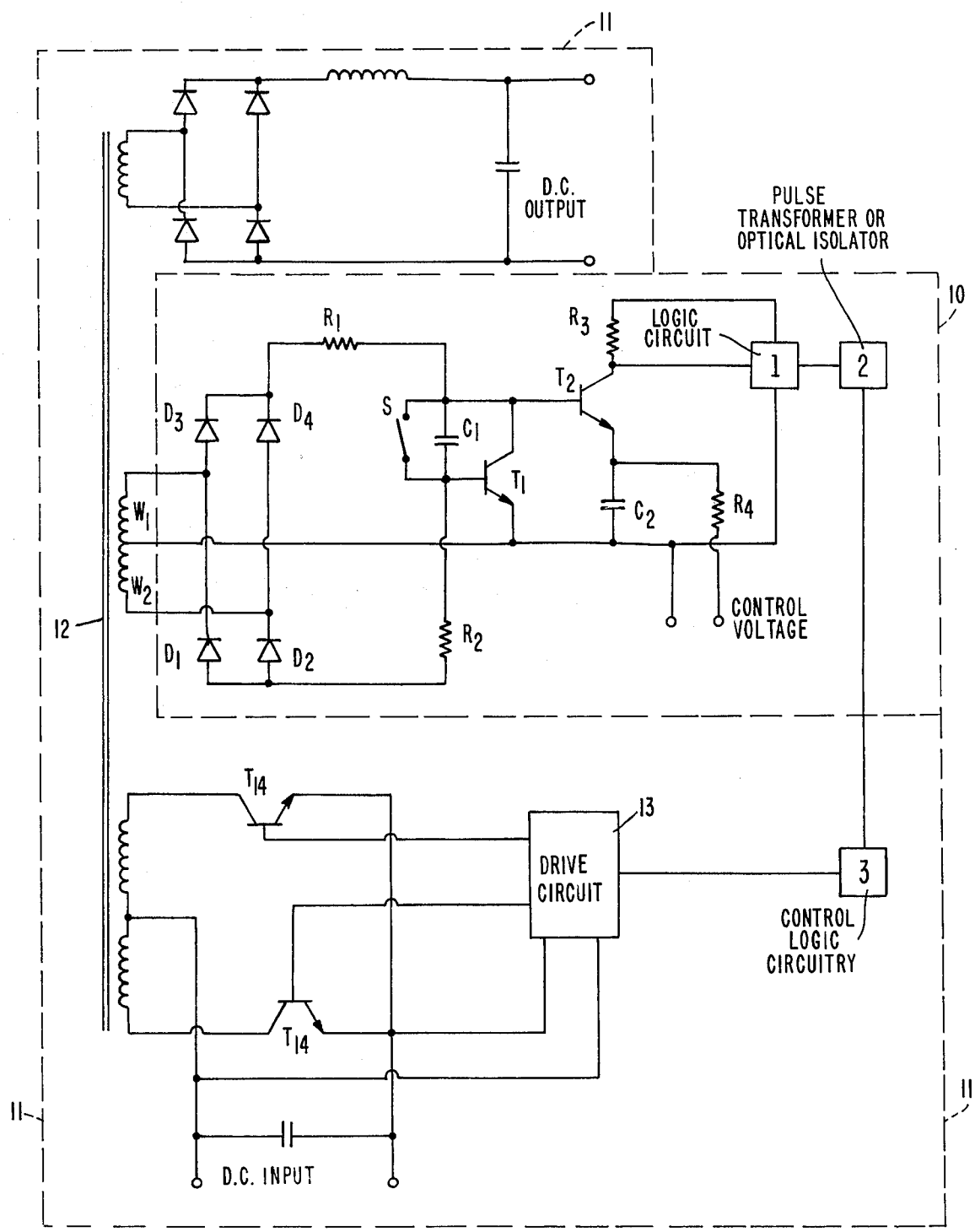

METHOD OF OBTAINING A CONSTANT VOLTAGE OUTPUT IN POWER SUPPLIES

BACKGROUND OF THE INVENTION

This invention relates to power supplies and more particularly to the control of the output voltage of power supplies in order to obtain a constant voltage output.

It is to be understood that "power supplies" include mains operated d.c. power supplies, d.c. - d.c. converters, battery eliminators, battery chargers and the like which utilize pulse width modulated d.c. - d.c. conversion.

Commonly used switch mode power supplies exhibit considerable non-linearity which causes any ripple voltage present at the d.c. input to be transferred partially to the output of the units. The non-linearity is mainly caused by variation in circuit delays and storage times in the output transistors used in this type of unit.

SUMMARY OF THE INVENTION

Furthermore the decrease in storage time in the output transistors with increasing load currents results in the power supply having relatively high dynamic output impedance.

It is the object of this invention to provide a power supply which overcomes the above disadvantages and which provides a constant output voltage, with good ripple rejection from the input to the output and a low effective output impedance.

According to this invention there is provided a method of obtaining a constant voltage characteristic in a transistorised power supply utilizing pulse width modulated d.c. - d.c. conversion, the method comprising sensing the output voltage of the power supply, integrating for each half cycle of the power supply the output voltage with time, terminating the pulse drive to the output transistors of the power supply when a required value of the integral is reached and subtracting the value of the integral of voltage and time obtained during the period of drive circuit delay and storage time of the output transistors after said termination from the integral obtained during the next half cycle of the power supply output.

Further features of the invention provide further output voltage of the power supply to be sensed either directly from isolated secondary windings of the output transformer thereof or by a sensing transformer connected across one of the windings of the output transformer thereby, in both cases, providing an isolated control voltage for the pulse width modulation.

Still further features of the invention provide for the integration of voltage with time to be effected either by means of a Miller integrator or by means of an operational amplifier and for the instant at which the said required value of the voltage — time integral is reached to be communicated to the drive logic of the output transistors by means of a pulse generated by a logic circuit.

Yet still further features of the invention provide for said pulse from the logic circuit to be transmitted to the drive logic of the output transistors via a pulse transformer or via an optical isolator.

Furthermore, the transistors in the output of the d.c. - d.c. convertor may be replaced by appropriately controlled thyristors where this is reasonable without departing from the scope of the invention.

BRIEF DESCRIPTION OF THE DRAWING

A preferred embodiment of this invention is described below with reference to the accompanying drawing showing a part circuit and part block diagram of a control circuit for the output voltage of a d.c. - d.c. convertor.

DESCRIPTION OF A PREFERRED EMBODIMENT

The integration of volts and time referred to above is most suitably performed by means of a Miller integrator or an operational amplifier. In the present cast the circuit 10 for controlling the output voltage of a d.c.-d.c. convertor indicated generally at 11 includes a transistor $T_1$, a capacitor $C_1$ and two resistors $R_1$ and $R_2$. These latter circuit elements make up a Miller integrator of known type. The output voltage of the convertor 11 is sensed by means of the secondary windings $W_1$ and $W_2$ of the output transformer of the d.c. - d.c. convertor or a separate sensing transformer (not shown). This output voltage is rectified by diodes $D_1$, $D_2$, $D_3$ and $D_4$. The rectified voltage is applied to capacitor $C1$. When the voltage across capacitor $C_1$ reaches a comparison voltage provided across capacitor $C_2$ included in the control circuit 10, a switching transistor $T_2$ turns on and activates a logic circuit 1 of any suitable known type which causes switch S to close momentarily. Switch S can be a transistor switch or a FET switch and is connected across the capacitor $C_1$ as shown. The time during which the switch S is closed is very short compared with the half cycle period of the operating frequency of the d.c. - d.c. convertor. The pulse transformer 2, or optical isolator, and the control logic 3 may comprise any suitable circuitry of known type. At the instant when the switch S is closed the logic circuit 1 produces a pulse which is transmitted via a pulse transformer 2 or optical isolator to the control logic 3 for the drive circuit 13 for the output transistors T14 of the convertor. This pulse is used to terminate the conduction of the output transistors. However, the output transistors T14 keep on conducting due to circuit delays and due to storage time of these transistors even after the momentary closure of the switch S. During this period integration carries on and the charge on capacitor $C_1$ continues to increase until the main output transistors turn off. At this instance, the voltage on windings $W_1$ and $W_2$ collapses but the charge on capacitor $C_1$ is maintained until the next half cycle arrives. Again integration commences but the time taken to reach the comparison voltage on capacitor $C_2$ is now shortened because of the charge on capacitor $C_1$ retained from the previous half cycle.

Thus, as is apparent, the value of the voltage time integral obtained during the period of turn-off delay is effectively subtracted from the integral obtained during the next half cycle of the convertor. The voltage across capacitor $C_1$, reaches the value of the comparison voltage more quickly and hence compensation for the circuit time delay is achieved.

Transistors $T_1$ and $T_2$ are preferably on the same monolithic chip, so that the emitter base voltage VEB on $T_1$ exactly cancels out the emitter base voltage VEB on $T_2$. The control voltage is fed via the R - C network $R_4$ and $C_2$ to the transistor $T_2$.

The purpose of the isolated voltage control circuit as outlined above is to enable a number of convertors or other power supply units to be connected in series or parallel. It is further to be noted that where high accuracy in the tracking of a number of units connected in series or parallel is required, low tolerance components will have to be used in the circuit described. The connection in series and/or parallel of a number of units is an important feature of this invention.

The integrating system may be extended to two separate integrators, that is one integrator for each half cycle. The operation would be exactly the same as that described above except that the system performance would be altered, because the delay time will now always be subtracted from the same half cycle.

The system may also be extended to a multiphase system by having an integrator or any combination of integrators for each phase.

Thus the invention provides a circuit arrangement for a power supply which provides a constant output voltage.

It will be appreciated that in order to have a highly efficient power supply, it is desirable to include constant current control and protection of the d.c. - d.c. convertor against excessive collector currents as described in our South African Pat. No. 72/4202 filed June 19, 1972. Furthermore, in order to reduce the switching losses and the storage and fall times of the output transistors of the d.c. - d.c. convertor, it is essential to use a special drive circuit. This drive circuit will preferably be of the kind described in our further South African Pat. No. 72/7334 filed Oct. 16, 1972.

What I claim as new and desire to secure by Letters Patent is:

1. A method of obtaining a constant voltage characteristic in a transistorised power supply utilising pulse width modulated d.c. - d.c. conversion, the method comprising sensing the output voltage of the power supply, integrating for each half cycle of the power supply the output voltage with time, terminating the pulse drive to the output transistors of the power supply when a required value of the integral is reached and subtracting the value of the integral of voltage and time obtained during the period of drive circuit delay and storage time of the output transistors after said termination from the integral obtained during the next half cycle of the power supply output.

2. A method as claimed in claim 1 in which the output voltage of the power supply is sensed directly from isolated secondary windings of the output transformer thereof, thereby providing an isolated control voltage for the pulse width modulation.

3. A method as claimed in claim 1 in which the output voltage of the power supply is sensed by a sensing transformer connected across one of the windings of the output transformer of the supply, thereby providing an isolated control voltage for the pulse width modulation.

4. A method as claimed in claim 1 in which the output voltage of the power supply is sensed on the output of the rectifier diodes of the d.c. - d.c. convertor.

5. A method as claimed in claim 1 in which the integration of voltage with time is effected by means of a Miller integrator.

6. A method as claimed in claim 1 in which the integration of voltage with time is effected by means of an operational amplifier.

7. A method as claimed in claim 1 in which the instant at which the said required value of the voltage time integral is reached is communicated to the drive logic of the output transistors by means of a pulse generated by a logic circuit.

8. A method as claimed in claim 7 in which said pulse from the logic circuit is transmitted to the drive logic via a pulse transformer.

9. A method as claimed in claim 7 in which said pulse from the logic circuit is transmitted to the drive logic via an optical isolator.

* * * * *